US012607162B2

(12) United States Patent
Saltsman

(10) Patent No.: US 12,607,162 B2
(45) Date of Patent: Apr. 21, 2026

(54) FLOATING BODY

(71) Applicant: Joseph Saltsman, Fonda, NY (US)

(72) Inventor: Joseph Saltsman, Fonda, NY (US)

( * ) Notice: Subject to any disclaimer, the term of this patent is extended or adjusted under 35 U.S.C. 154(b) by 0 days.

(21) Appl. No.: 18/759,750

(22) Filed: Jun. 28, 2024

(65) Prior Publication Data

US 2024/0352915 A1 Oct. 24, 2024

Related U.S. Application Data

(63) Continuation-in-part of application No. 18/052,722, filed on Nov. 4, 2022, now abandoned.

(60) Provisional application No. 63/367,359, filed on Jun. 30, 2022.

(51) Int. Cl.
*F03B 13/16* (2006.01)

(52) U.S. Cl.
CPC ........ *F03B 13/16* (2013.01); *F05B 2220/706* (2013.01); *F05B 2240/93* (2013.01); *F05B 2260/40311* (2013.01)

(58) Field of Classification Search
CPC ............. B63B 2035/4466; F03B 13/16; F03B 13/1845; F03B 13/1865; F03B 13/1885
See application file for complete search history.

(56) References Cited

U.S. PATENT DOCUMENTS 1,061,061 A * 5/1913 Frame ................ F03B 13/1815 60/505
1,066,396 A * 7/1913 Frame ................ F03B 13/1885 60/504
4,145,885 A * 3/1979 Solell .................. F03B 13/1855 60/507
4,803,839 A * 2/1989 Russo, III ........... F03B 13/1865 60/507
6,247,308 B1 * 6/2001 Solell .................. F03B 13/1815 74/125.5
2007/0164568 A1 7/2007 Greenspan et al.
2010/0043425 A1 * 2/2010 Dragic .................. F03B 13/189 60/504
2010/0045044 A1 2/2010 Patterson
2012/0235413 A1 * 9/2012 Piccinini ............. F03B 13/1865 290/53

(Continued)

FOREIGN PATENT DOCUMENTS

KR 20070098300 A * 10/2007

*Primary Examiner* — Jonathan R Matthias
(74) *Attorney, Agent, or Firm* — Heslin Rothenberg Farley & Mesiti P.C.

(57) ABSTRACT

An apparatus and method include a floating body that reciprocates in a vertical direction based on motion, and a drive assembly. The drive assembly includes two bearings coupled to opposing sides of a frame. Each bearing applies a single directional torque to a drive shaft. The drive shaft is threaded through the bearings. The drive shaft rotates based on the movement of the floating body. The drive assembly includes a gear wheel attached to each bearing. The gear wheels are bridged with a planetary gear. The drive assembly includes a spool attached to each bearing. A cable is affixed to each spool; each cable is affixed to an opposing side of the frame relative to another cable. The drive shaft includes a generator coupled to the drive assembly via the drive shaft. The generator serves as a power takeoff mechanism, converting rotating engine power into electrical power.

13 Claims, 13 Drawing Sheets

(56) References Cited

U.S. PATENT DOCUMENTS

| | | | | |
|---|---|---|---|---|
| 2017/0145984 | A1 | 5/2017 | Matthews et al. | |
| 2021/0372361 | A1* | 12/2021 | Stockman ............... | F03B 13/20 |

* cited by examiner

FLOATING BODY

CROSS-REFERENCE TO RELATED APPLICATIONS

This application is a continuation-in-part of U.S. patent application Ser. No. 18/052,722, entitled "FLOATING BODY" filed on Nov. 4, 2022, and claims priority to U.S. patent application Ser. No. 18/052,722, entitled "FLOATING BODY" filed on Nov. 4, 2022, and claims priority to Patent Cooperation Treaty Application No. PCT/US2023/069459, entitled "FLOATING BODY" filed Jun. 30, 2023, which claims priority to U.S. Provisional Patent Application No. 63/367,359, entitled "FLOATING BODY" filed Jun. 30, 2022, and to U.S. patent application Ser. No. 18/052,722, entitled "FLOATING BODY" filed on Nov. 4, 2022. The entire contents of all these applications are hereby incorporated herein by reference in their entireties.

BACKGROUND

Hydroelectric power and thermal power generation are important sources or renewable energy. Hydroelectric power utilizes the physical environment of rivers, lakes, oceans, and other bodies of water to generate power for generators, etc. Harnessing wave energy can be utilized to power various systems.

SUMMARY

Shortcomings of the prior art can be overcome and benefits as described later in this disclosure can be achieved through the provision of an apparatus for generating power from the movement of a floating body based on the motion of waves or any other reciprocal motion. The apparatus comprises a floating body, where the floating body reciprocates in a vertical direction based on motion, and a drive assembly. The drive assembly includes two bearings coupled to opposing sides of a frame, wherein each bearing applies a single directional torque to a drive shaft. The drive shaft is threaded through the bearings, wherein the drive shaft rotates based on the movement of the floating body. The drive assembly also includes a gear wheel attached to each bearing, wherein the gear wheels are bridged with a planetary gear. The drive assembly also includes a spool attached to each bearing, wherein a cable is affixed to each spool, where each cable is affixed to an opposing side of the frame relative to another cable. The drive shaft also includes a generator coupled to the drive assembly via the drive shaft, where the generator serves as a power takeoff mechanism, converting rotating engine power into electrical power.

Shortcomings of the prior art can be overcome and benefits as described later in this disclosure can be achieved through the provision of a method for generating power from the movement of a floating body based on the motion of waves or any other reciprocal motion. The method includes placing an apparatus in a body of water, wherein the body of water experiences wave activity, the apparatus a floating body, where the floating body reciprocates in a vertical direction based on motion, and a drive assembly. The drive assembly includes two bearings coupled to opposing sides of a frame, wherein each bearing applies a single directional torque to a drive shaft. The drive shaft is threaded through the bearings, wherein the drive shaft rotates based on the movement of the floating body. The drive assembly also includes a gear wheel attached to each bearing, wherein the gear wheels are bridged with a planetary gear. The drive assembly also includes a spool attached to each bearing, wherein a cable is affixed to each spool, where each cable is affixed to an opposing side of the frame relative to another cable. The drive shaft also includes a generator coupled to the drive assembly via the drive shaft, where the generator serves as a power takeoff mechanism, converting rotating engine power into electrical power. The method includes extracting power from the apparatus based on the apparatus experiencing the wave activity, where based on the wave activity, comprising successive waves, the drive assembly moves upwards and downwards in the vertical direction and the drive shaft rotates clockwise during both the upwards and the downwards motion.

Shortcomings of the prior art can be overcome and benefits as described later in this disclosure can be achieved through the provision of an apparatus for generating power from the movement of a floating body based on the motion of waves or any other reciprocal motion. The apparatus can include a floating body, where the floating body reciprocates in a vertical direction based on motion. The apparatus can also include a drive assembly, the drive assembly comprising: a drive connected to the floating body to move upwards and downwards in the vertical direction based on the movement of the floating body; at least one driving arm connected to the drive such that each driving arm of the at least one driving arm extends in a direction perpendicular to the vertical direction; at least one cable coupling the at least one driving arm to a clutch on a drive shaft; and the drive shaft, where the drive shaft rotates based on the movement of the floating body.

Shortcomings of the prior art can be overcome and benefits as described later in this disclosure can be achieved through the provision of an apparatus for generating power from the movement of a floating body based on the motion of waves or any other reciprocal motion. The apparatus can include: a floating body, wherein the floating body reciprocates in a vertical direction based on motion; and a drive assembly, the drive assembly comprising: a drive tower connected to the floating body to move upwards and downwards in the vertical direction based on the movement of the floating body; at least one driving arm connected to the drive tower such that each driving arm of the at least one driving arm extends in a direction perpendicular to the vertical direction; at least one cable coupling the at least one driving arm to a clutch on a drive shaft; and the drive shaft, wherein the drive shaft rotates based on the movement of the floating body.

Shortcomings of the prior art can be overcome and benefits as described later in this disclosure can be achieved through the provision of a method for generating power from the movement of a floating body based on the motion of waves or any other reciprocal motion. The method can include: placing an apparatus in a body of water, wherein the body of water experiences wave activity, the apparatus comprising: a floating body, wherein the floating body is positioned proximate to the body of water such that movement of the floating body comprises the floating body reciprocating in a vertical direction based on the wave activity; a drive assembly, the drive assembly comprising: a drive connected to the floating body to move upwards and downwards in the vertical direction based on the movement of the floating body; at least one driving arm connected to the drive such that each driving arm of the at least one driving arm extends in a direction perpendicular to the vertical direction; at least one cable coupling the at least one driving arm to a clutch on a drive shaft; and the drive shaft, wherein the drive shaft rotates based on the movement of the floating body; and extracting power from the apparatus based on the apparatus experiencing the wave activity, wherein based on the wave activity, comprising successive waves, the drive assembly moves upwards and downwards in the vertical direction and the drive shaft rotates clockwise during both the upwards and the downwards motion.

Shortcomings of the prior art can be overcome and benefits as described later in this disclosure can be achieved through the provision of an apparatus for generating power from the movement of a floating body based on the motion of waves or any other reciprocal motion. The apparatus can include: a floating body, wherein the floating body is positioned proximate to a body of water such that movement of the floating body comprises the floating body reciprocating in a vertical direction based on motion of waves within the body of water; and a drive assembly, the drive assembly comprising: at least one vertical drive tower coupled to the floating body to move upwards and downwards in the vertical direction based on the movement of the floating body; at least one driving arm connected to the at least one vertical drive tower such that each driving arm of the at least one driving arm extends in a direction perpendicular to the vertical direction; at least one cable coupling each driving arm of the at least one driving arm to a clutch selected from one or more clutches on one or more drive shafts; and the one or more drive shafts, wherein each of the one or more drive shafts rotates based on the movement of the floating body.

Shortcomings of the prior art can be overcome and benefits as described later in this disclosure can be achieved through the provision of an apparatus for generating power from the movement of a floating body based on the motion of waves or any other reciprocal motion. The apparatus can include: one or more floating bodies, wherein the one or more floating bodies are positioned proximate to a body of water such that movement of the one or more floating bodies comprises the one or more floating bodies reciprocating in a vertical direction based on motion of waves within the body of water; one or more drive assemblies, each of the one or more drive assemblies comprising: at least one vertical drive tower coupled to at least one floating body of the one or more floating bodies to move the at least one floating body upwards and downwards in the vertical direction; at least one driving arm connected to the at least one vertical drive tower such that each driving arm of the at least one driving arm extends in a direction perpendicular to the vertical direction; at least one cable coupling each driving arm of the at least one driving arm to a clutch selected from one or more clutches on one or more drive shafts; and the one or more drive shafts, wherein each of the one or more drive shafts rotates based on the movement of the at least one floating body of the one or more floating bodies.

Additional features are realized through the devices and techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
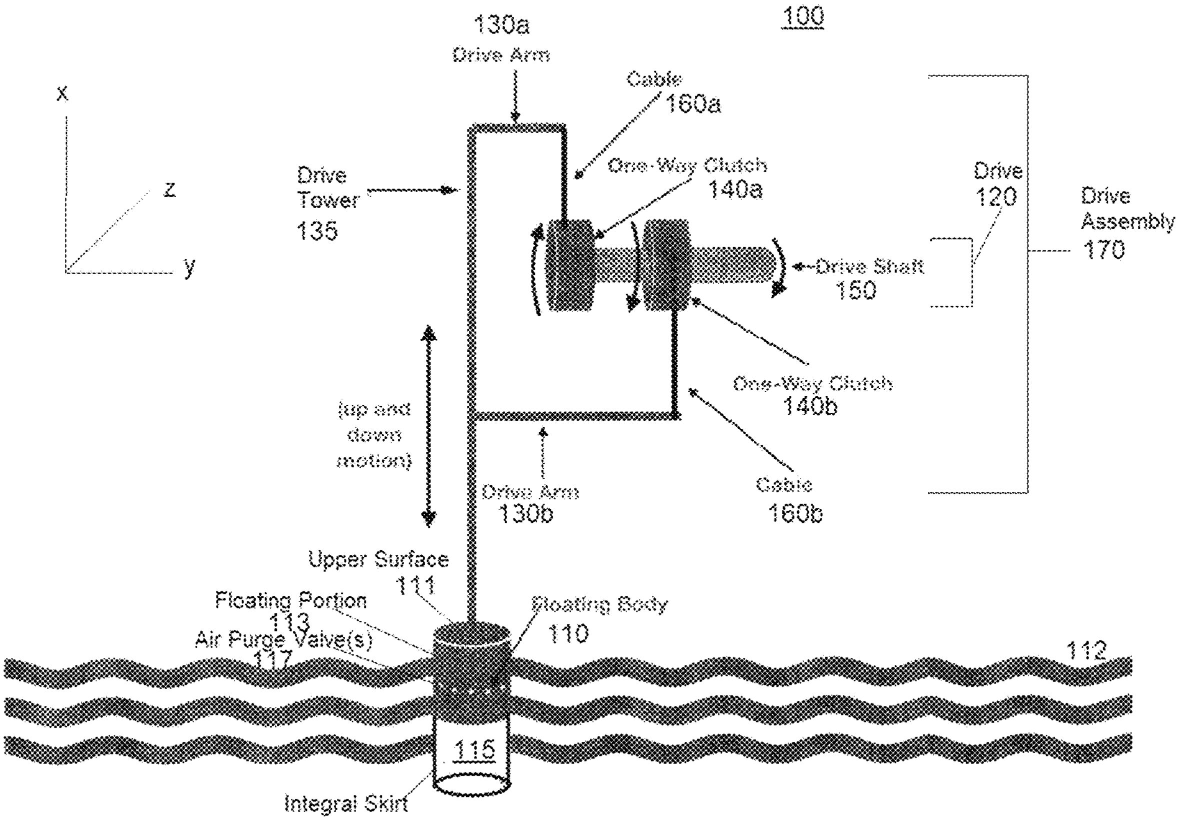
FIG. 1 depicts aspects of some embodiments of an apparatus described herein.

The accompanying figures, which are not drawn to scale for ease of understanding, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively," or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations.

Embodiments of the present invention include a system, method, and apparatus for generating energy from reciprocating motion. Although certain figures illustrate these examples in the context of harvesting ocean wave energy, as understood by one of skill in the art, aspects of certain of the examples illustrated herein can be implemented in any environment to harvest energy from reciprocating motion.

Figure 2:
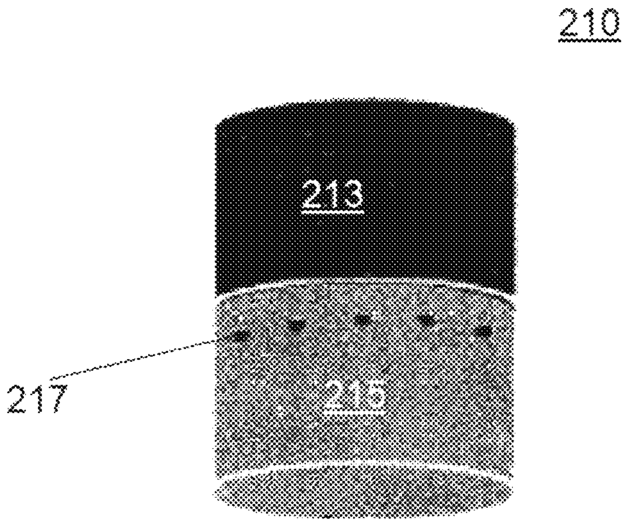
FIG. 2 depicts a floating body which is included in the apparatus of FIG. 1.

As illustrated in FIG. 1, aspects of the present invention, a power generation system 100, include a floating body 110 that reciprocates vertically with the wave motion. FIG. 2 depicts the floating body 200 itself without the other aspects depicted in FIG. 1. Reciprocating motion, also called reciprocation, is a repetitive up-and-down or back-and-forth linear motion. It is found in a wide range of mechanisms, including reciprocating engines and pumps. The two opposite motions that comprise a single reciprocation cycle are called strokes. Wave energy is a renewable energy with a high density. In the examples herein, the system described utilizes wave energy, including in the ocean, and provides a reciprocating wave power generation system.

Returning to FIG. 1, to indicate relative directions throughout the description of various aspects of the system and environment 100 depicted in FIG. 1, FIG. 1 includes three axis, an x-axis, a y-axis, and a z-axis. These axis indicate approximate directions of various elements of the system relative to each other, for illustrative purposes. Embodiments can include a fixed platform (not pictured) and a floating body 110 with a drive tower 135 that moves up and down.

In FIG. 1, connected to the floating body 110 is a drive 120, which is a member that reciprocates with the floating body. In some examples, the drive 120 can be comprised of a rigid material, and the member is solid. The drive 120 can be comprised of various materials, including but not limited to, metal. In some embodiments, attached to the drive 120 are one or more drive arms 130*a*, 130*b*. FIG. 1 illustrates a non-limiting example of the floating body disclosed herein that include two drive arms 130*a*, 130*b* attached to the drive 120. In this example, as the drive 120 upward from an upper surface 111 of the floating body 110, on an axis, x that is perpendicular to both a y axis and a z axis, the upper surface 111 parallel to both these horizontals. The directions provided in this figure are relative and approximate and provided for illustrative purposes. The drive arms 130*a*, 130*b* are both connected to a vertical drive tower 135 and thus, the drive 120 includes a vertical drive tower configuration. In certain examples herein, an alternative configuration, referred to as a two vertical drive tower configuration can be utilized. FIG. 4 illustrates this two vertical drive tower configuration while FIG. 1, as well as FIG. 3, both illustrate a one vertical drive tower configuration.

Although FIG. 1 illustrates a single drive 120, which can also be understood as a (e.g., rigid) single vertical drive tower, in some examples, a drive assembly can include more than one vertical drive tower. The additional elements of the drive assembly can be duplicated in the same manner and/or each drive member can be coupled to a single drive shaft, or at least one drive shaft. To provide clearer illustrations, in some of the figures, only a single shaft is illustrated. However, each shaft illustrated can represent one to multiple shafts depending on the embodiments of the apparatuses described herein. Single shafts are illustrated for clarity and not to suggest any limitations.

As illustrated in FIG. 1, the first drive arm 130*a* and the second drive arm 130*b*, are each coupled to a drive shaft 150 via cables 160*a*, 160*b*, which are the fasteners utilized in this example but are not provided to suggest any limitations to what can be utilized to fasten the drive arms 130*a*, 130*b* to a clutch 140*a*, 140*b* of a drive shaft 150.

As illustrated in FIG. 1, the drive arms 130*a*, 130*b* reciprocate vertically with the floating body 110. In this example, both drive arms 130*a*, 130*b* are attached to one-way clutches 140*a*, 140*b* on the drive shaft 150 with cables 160*a*, 160*b*. As understood by one of skill in the art, a one-way clutch is a functional component utilized for transmitting or suspending torque, which transmits torque in one rotational direction while stopping torque transmission in the opposite direction. In this example, each drive arm 130*a*, 130*b* is attached with one cable 160*a*, 160*b*, although the number of cables can vary. In the non-limiting example with two cables, a first cable 160*a*, is attached to a backside of a first one-way clutch 140*a*, and a second cable 160*b*, is attached to the frontside of the second one-way clutch 140*b*. The attachments of the cables to the clutches are illustrated in more detail in FIG. 3.

Figure 3:
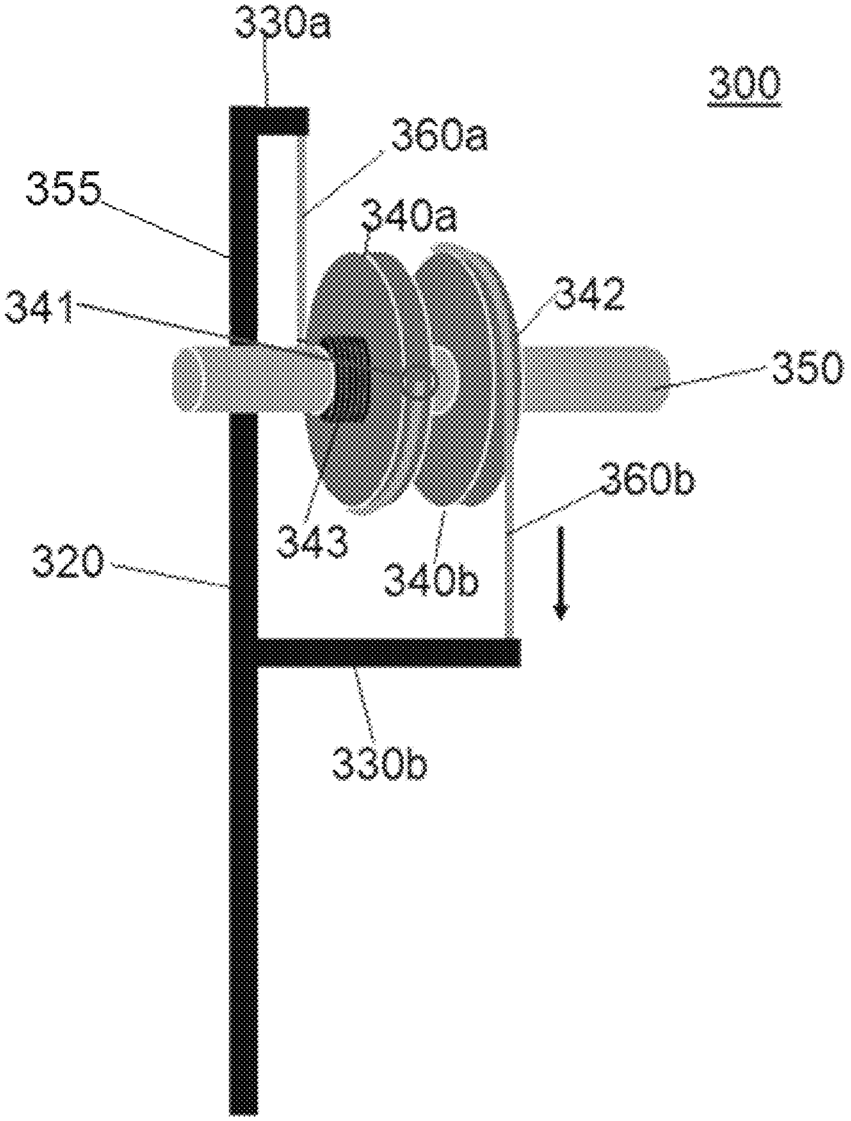
FIG. 3 depicts various aspects of some embodiments of the present invention.
Figure 4:
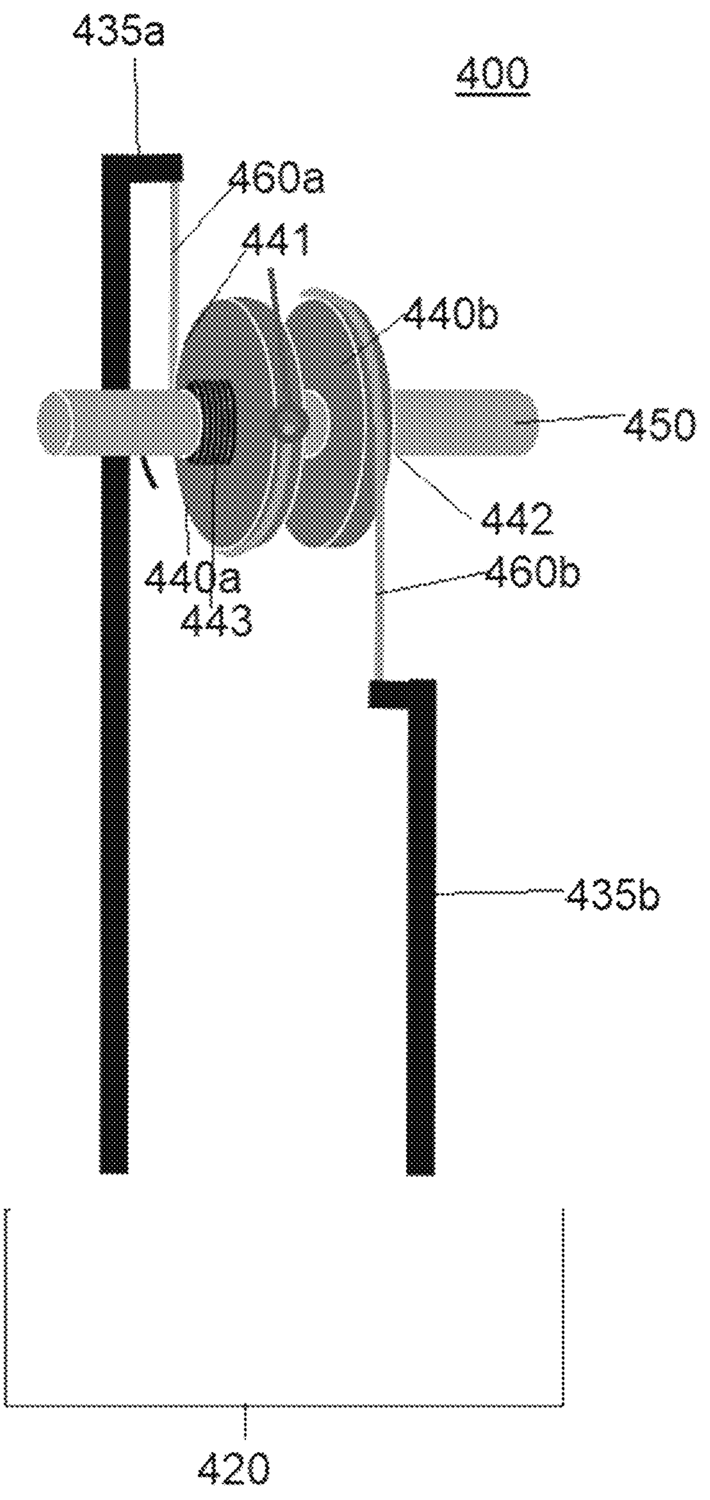
FIG. 4 depicts various aspects of some embodiments of the present invention.

FIG. 3 illustrates the aforementioned one (vertical) drive-arm tower configuration 300 (which includes a drive tower 335) utilized in some embodiments of the present invention. FIG. 3 also illustrates the attachment of the cables 360*a*, 360*b* to the one-way clutches 340*a*, 340*b* on the drive shaft 350. Based on the view provided in FIG. 3, one can view that the first cable 360*a*, is attached to a frontside 341 of a first one-way clutch 340*a*, and a second cable 360*b*, is attached to the backside 342 of the second one-way clutch 340*b*. The drive tower 335 moves up and down. When the drive tower 335 is moving upwards, the drive shaft 350 rotates in a first direction (e.g., clockwise). When the drive tower 335 moves in a downward direction, the drive shaft 350 can rotate in the same direction (e.g., clockwise). In this example, while the drive tower 335 moves upwards, the first cable 360*a* drives the drive shaft 350 clockwise via the one-way action of the first clutch 340*a*. Simultaneously, in this example, the second cable 360*b* is re-wound on the second one-way action of the clutch 340*b* with a recoil spring hidden behind the second clutch 340*b* in the view depicted in FIG. 3. During a downwards motion, the first cable 360*a* is re-wound on the first one-way clutch 340*a*, with the recoil spring 343 (this recoil spring is visible in the view provided in FIG. 3). Simultaneously, the second cable 360*b* drives the drive shaft 350 clockwise. In some examples, the direction in which the first one-way clutch 340*a* rotates when the first cable 360*a* is extracted from the first one-way clutch 340*a* opposes the rotation realized on the second one-way clutch 340*b* while the second cable 360*b* rewinds. When vertical motion (of the drive tower 335) reverses, the extraction-rewind roles on the clutched are reversed.

Returning to FIG. 1, as illustrated in this FIG. 1 as well as in FIG. 3, during an upwards motion, which we can refer to as up motion (in the context of FIG. 1, proceeding upward from the base of the x-axis), a wave 112 raise the drive assembly 170 (which includes the drive tower 135, the drive arms 130*a*, 130*b* and the cables 160*a*, 160*b*) also raises (moves upward) (in the context of FIG. 1, proceeding upward from the base of the x-axis). The first cable 160*a* drives the drive shaft 150 clockwise via one-way the first clutch 140*a*. Simultaneously, in this example, the second cable 160*b* is re-wound on the second one-way clutch 140*b* with a recoil spring (e.g., FIG. 3, 343). During a downwards motion (in the context of FIG. 1, proceeding downward on the x-axis), which we can refer to as down motion, as the wave 112 lowers the drive assembly, the first cable 160*a* is re-wound on the first one-way clutch 140*a*, with a recoil spring (e.g., FIG. 3, 343). Simultaneously, the second cable 160*b* drives the drive shaft 150 clockwise. This process repeats with each successive wave in some embodiments of the present invention.

Referring to depictions of the floating body 110, 210 in both FIGS, 1 and 2, the floating body 110, 210 is a flotation device that include a floating portion 113, 213 body with an integral skirt 115, 215 and one or more air purge valves in the skirt 117, 217. The air purge valves 117, 217 can also be understood as air bleed valves. A non-limiting example of the floating body is illustrated in FIG. 2.

Referring to FIG. 2, the floating portion 213 is a sealed flotation container. In some examples, the container is completely sealed. The integral skirt 215 is an open-bottomed skirt attached to the floating portion 213. The integral skirt 215 includes one or more (in this case more than one) one-way air bleed valves which are air purge valves 217. As the floating body 110, 210 rises with a wave 112, entrapped air will exit the integral skirt 215, a skirted cavity, while not letting air enter as the float descends (also with the wave 112 motion). As the wave rises, any entrapped air exits the skirted area via the air bleed valves. The result is water pushing up on the floatation portion 213. As the wave drops, the air bleed valves (also referred to as the air purge valves 217) close not allowing air back into the area of the integral skirt 215. The result is water being entrapped in the integral skirt 215 during wave descent. This in turn adds extra mass to the descent, which can increase power extraction (based on increasing power generated).

In contrast to FIG. 3, FIG. 4 illustrates an example that include a dual or two vertical drive tower configuration 400 utilized in some embodiments of the present invention: the first vertical drive tower 435*a* and the second vertical drive tower 435*b*. Like FIG. 3, FIG. 4 illustrates the attachment of the cables 460*a*, 460*b* to the one-way clutches 440*a*, 440*b* on the drive shaft 450. The first cable 460*a*, is attached to a frontside 441 of a first one-way clutch 440*a*, and a second cable 460*b*, is attached to the backside 442 of the second one-way clutch 440*b*. The drive 420 moves up and down. When the drive 420 is moving upwards, the drive shaft 450 rotates in a first direction (e.g., clockwise). When the drive shaft 420 moves in a downward direction, the drive shaft 450 can rotate in the same direction (e.g., clockwise). In this example, while both vertical drive towers are moving upwards, the first cable 460*a* drives the drive shaft 450 clockwise via the one-way the first clutch 440*a*. Simultaneously, in this example, the second cable 460*b* is re-wound on the second one-way clutch 440*b* with a recoil spring (behind the second clutch 440*b* and not visible in FIG. 4). During a downwards motion, the first cable 460*a* is re-wound on the first one-way clutch 440*a*, with the recoil spring 443. Simultaneously, the second cable 460*b* drives the drive shaft 450 clockwise.

Figure 5:
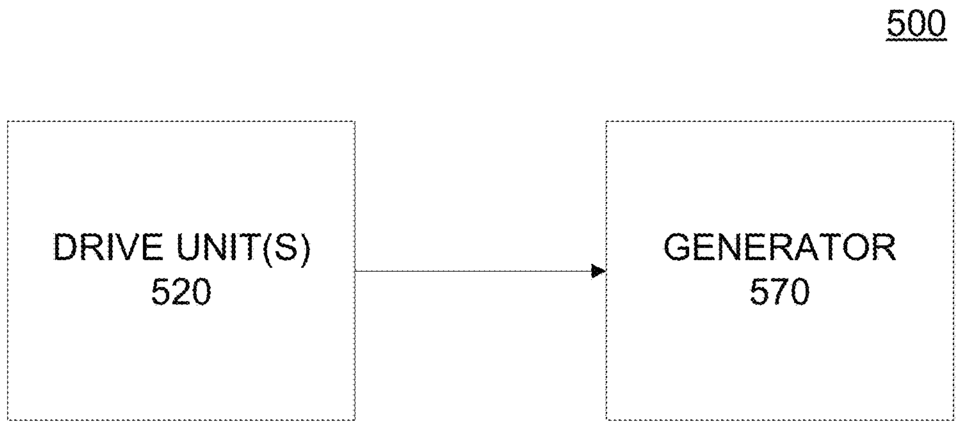
FIG. 5 is a block diagram that depicts various aspects of some embodiments of the present invention.
Figure 6:
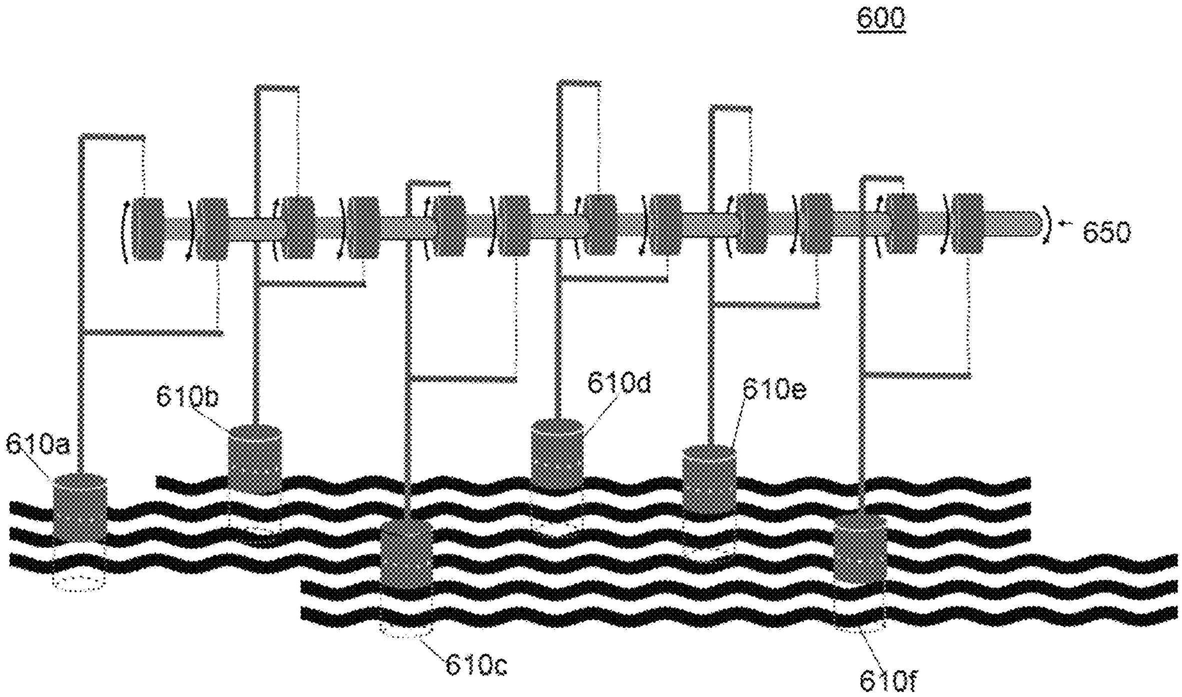
FIG. 6 depicts aspects of some embodiments of an apparatus described herein.
Figure 7:
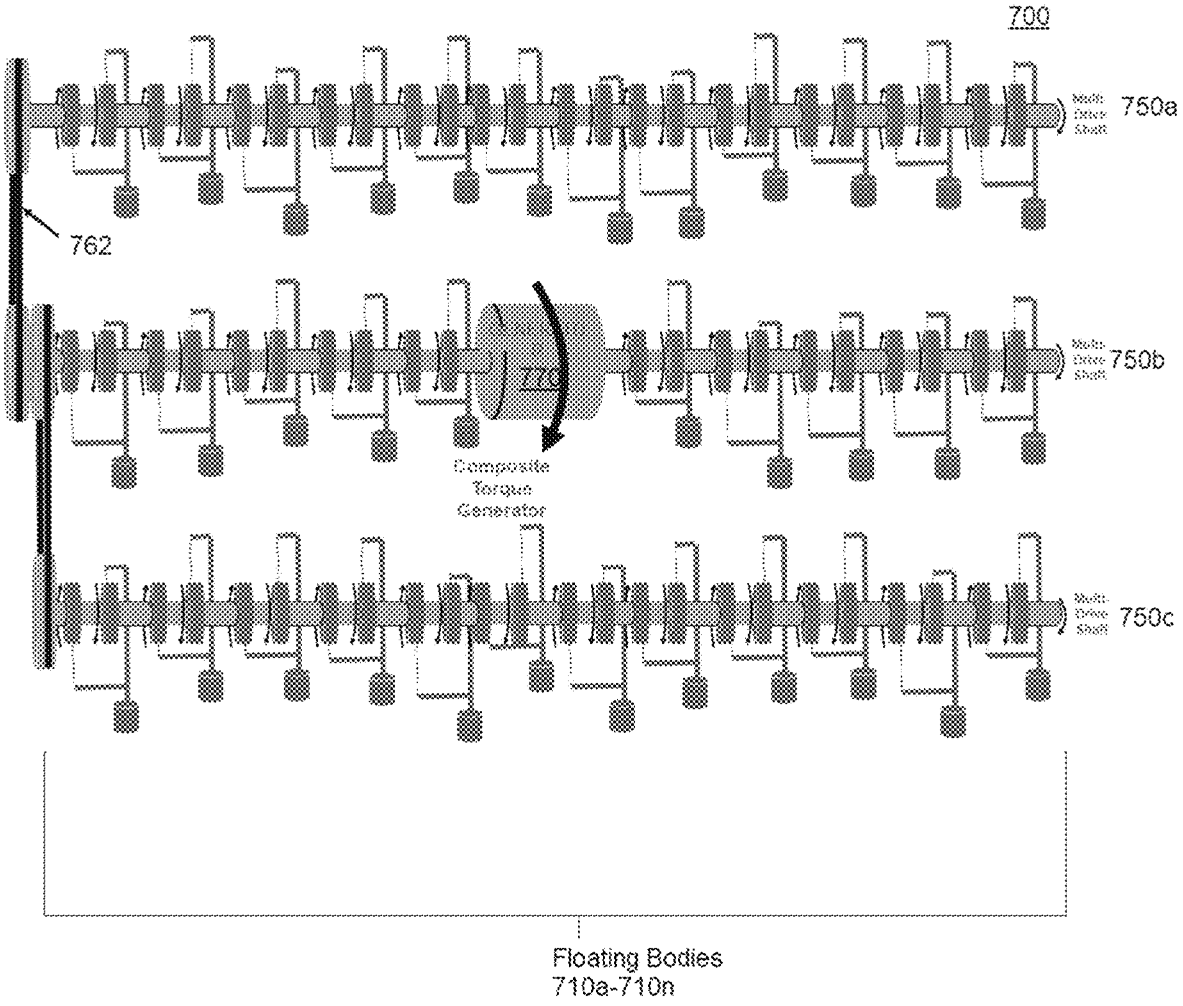
FIG. 7 depicts aspects of some embodiments of an apparatus described herein.

In the examples herein, one or more drives or drive units power a generator, providing power based on wave movements. FIG. 5 illustrates the drive unit(s) 520 to generator 570 connectivity employed in the power generation mechanism 500 in the examples herein. Examples can include one or more drive shaft. FIG. 1, discussed above, illustrates an example 100 with one drive shaft 150 and one floating body 110. FIG. 6 is an example 600 with more than one floating body 610*a*-610*f* (the number of floating bodies is provided as a non-limiting example and can vary based on power generation requirements for the implementation) and a single drive shaft 650. Meanwhile, FIG. 7 illustrates an example with more than one floating body 710*a*-710*n* (the number of floating bodies illustrated in FIG. 7 is provided as a non-limiting example and can vary based on power generation requirements for the implementation) and multiple drive shafts 750*a*-750*c* (this number of drive shafts provided is shown for illustrative purposes as a non-limiting example). FIG. 5 illustrates aspects of each of these examples 100, 600, 700, because each includes at least one drive unit 520 (e.g., drive shafts 150, 650, 750*a*-750*c*) which can be coupled to at least one generator 570. The main generator can include, but is not limited to, a constant voltage DC or synchronous AC generator that may include a power system stabilizer.

The continuity of the torque signature produced by various embodiments of the present invention can vary. FIG. 1 depicts an example with one floating body 110 and additional embodiments of the present invention can include multiple floating bodies 610*a*-610*f*, 710-710*n* (e.g., FIG. 6, FIG. 7) working together in unity. FIGS. 1 and 6 illustrate examples with a single drive 120, 620 (e.g., FIG. 5 drive unit 520). In some instances, when a single drive unit 520 is attached to a generator, the drive unit 520 can have a discontinuous torque signature. In some instances, the drive unit 520 generates no torque (or close to no torque) when the float (e.g., FIG. 1, 110) is momentarily still during a crest or a trough of a wave. To create a more continuous torque signature, the example 600 in FIG. 6 includes multiple floating bodies 610*a*-610*f*, in series. The multiple floating bodies 610-610*f* on a common drive shaft 650 will rarely, if at all, experience simultaneous crests and/or troughs. FIG. 7 illustrates an example 700 that generates greater torque and continuous torque because the multiple drive shafts 750*a*-750*c* enable a more even distribution of torque.

Referring to FIG. 7, the drive shafts 750*a*-750*c* are coupled together and in this configuration, can drive a common generator 770 (e.g., FIG. 5, 570). FIG. 7 illustrates a non-limiting examples of a possible configuration of multiple drive shafts 750*a*-750*c* in an embodiment of the present invention. This configuration can statistically eliminate "no-torque" situations and can increase output to the generator 770 (e.g., FIG. 5, 570). The generator can be understood as a composite torque generator 770. In this example, the drive shafts 750*a*-750*c* are coupled via a connecting mechanism 762 (e.g., a shaft linkage), which can include, but is not limited to, chains, gears, etc. Various arrows are provided in FIG. 7 to provide examples of the rotation of the shafts 750*a*-750*b* to generate power (the varying toques are combined into a composite torque). FIG. 7 can be understood as a multi-shaft power plant.

Figure 8:
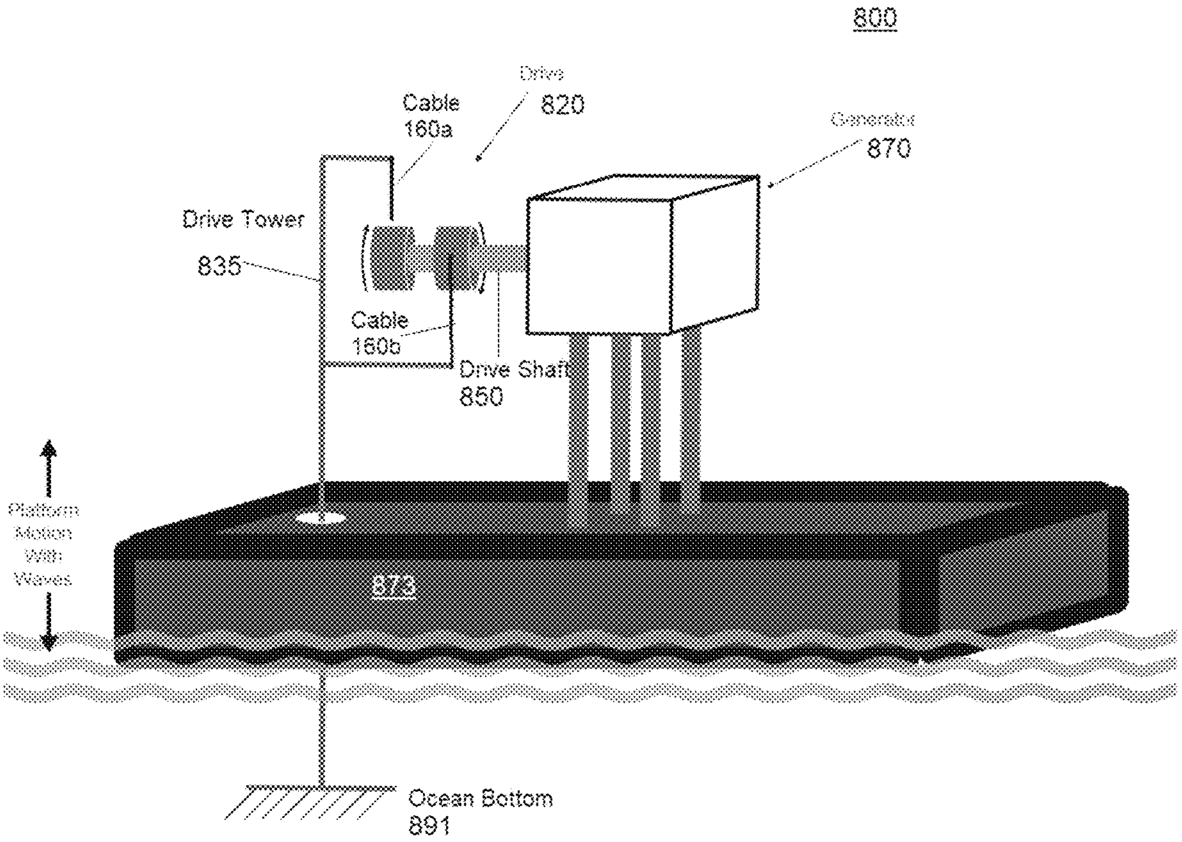
FIG. 8 depicts some aspects of some embodiments of an apparatus described herein.

FIG. 8 is an example of another configuration 800 of the examples described herein. FIGS. 1-4 and 6-7 illustrate aspects of embodiments of the present invention that can include a fixed platform and a floating body with at least one drive tower that moves up and down (as illustrated with an axis in FIG. 1). In FIG. 8, a drive tower 835 is fixed to the ocean bottom 891 while a platform 873 moves up and down. The movement of the platform 873 causes the generator 870, which is connected coupled to a drive shaft 850 to move up and down. With the drive shaft 850 moving up and down, the cables, the first cable 160*a* and the second cable 160*b*, will extract and retract as described in earlier examples.

Some examples of the apparatus described herein include a gear that is inserted between the two spools rather than recoil springs, which, as illustrated in earlier figures, can be utilized for recoiling. As with the examples discussed earlier, these examples can include a single shaft up to multiple shafts. For illustrative purposes only and not to suggest any limitations, the single shaft and double shaft configurations will be discussed herein. In these examples, the gear is utilized because in some situations, this embodiment can provide more reliable because of the omission of hanging weights, which can tangle or on springs, which can break. In these examples, neither hanging weights nor springs are utilized for recoil. In these examples, which are illustrated in greater details in FIGS. 9-14, as one side (e.g., left) pulls, a fixed planetary gear will drive the opposing (e.g., right) spool in a reverse direction. The reverse direction on the spool (e.g., right) is possible because a one-way clutch will slip while being driven. This reverse direction will cause the cable to get reloaded on the retracting spool. This operations reverses from one side to the other (e.g., right to left) when the opposing (e.g., right) side is pulled. Certain of FIGS. 9-14 depict a square frame holding both a floating body and as being a structure to which the bearings utilized in these examples are affixed. In earlier examples, an a-frame was discussed as being utilized for structural enforcement purposes. The shape of the frames utilized in the examples herein can vary and the square frame is depicted in these examples for illustrative purposes only and not to suggest any limitations. In these examples, for depicted, a placeholder shape is substituted for the floating body 110 (e.g., FIG. 1) itself in order to focus these figures on the use of gears for recoil. However, the placeholder shape accurately portrays placement and orientation of the floating body (e.g., FIG. 1, 110).

Figure 9:
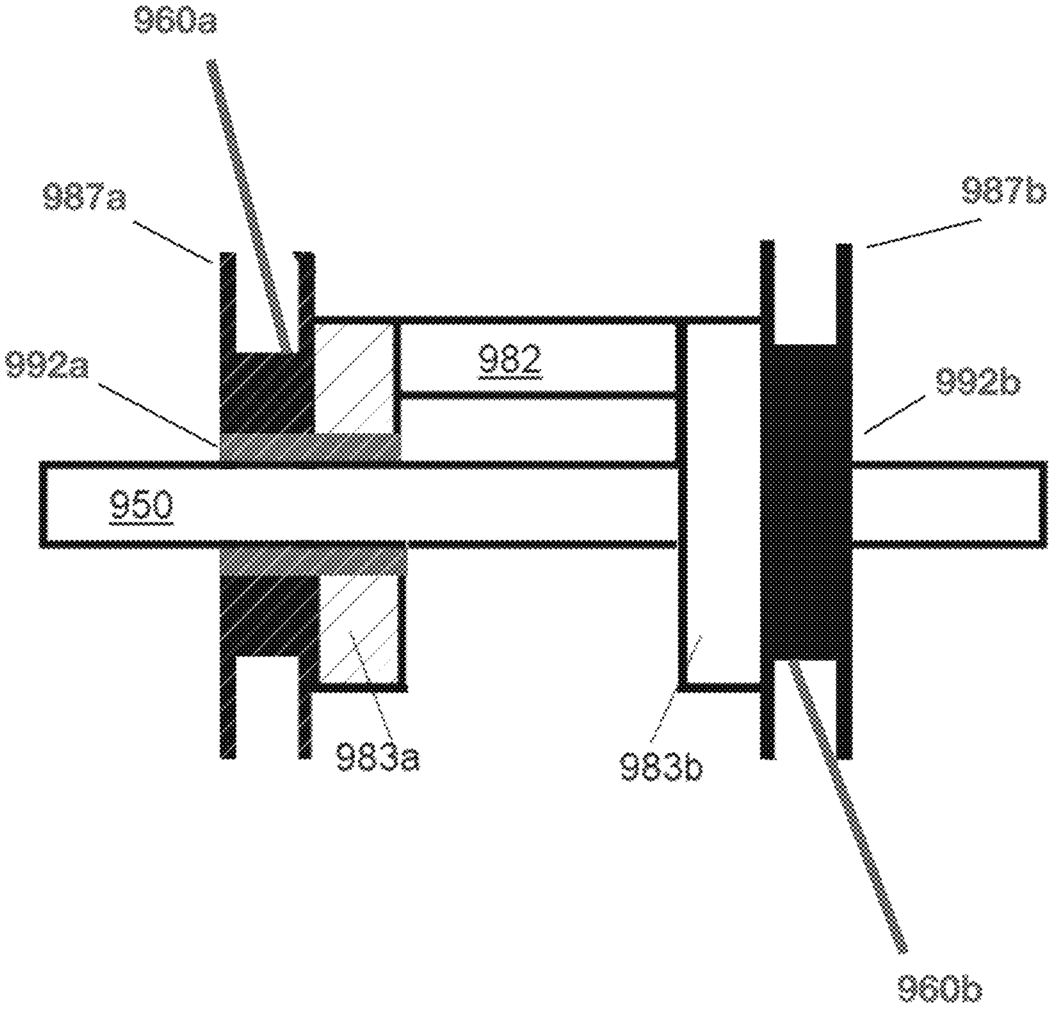
FIG. 9 is a simplified block diagram that illustrates various aspects of a drive mechanism of an example of the apparatus described herein.
Figure 10:
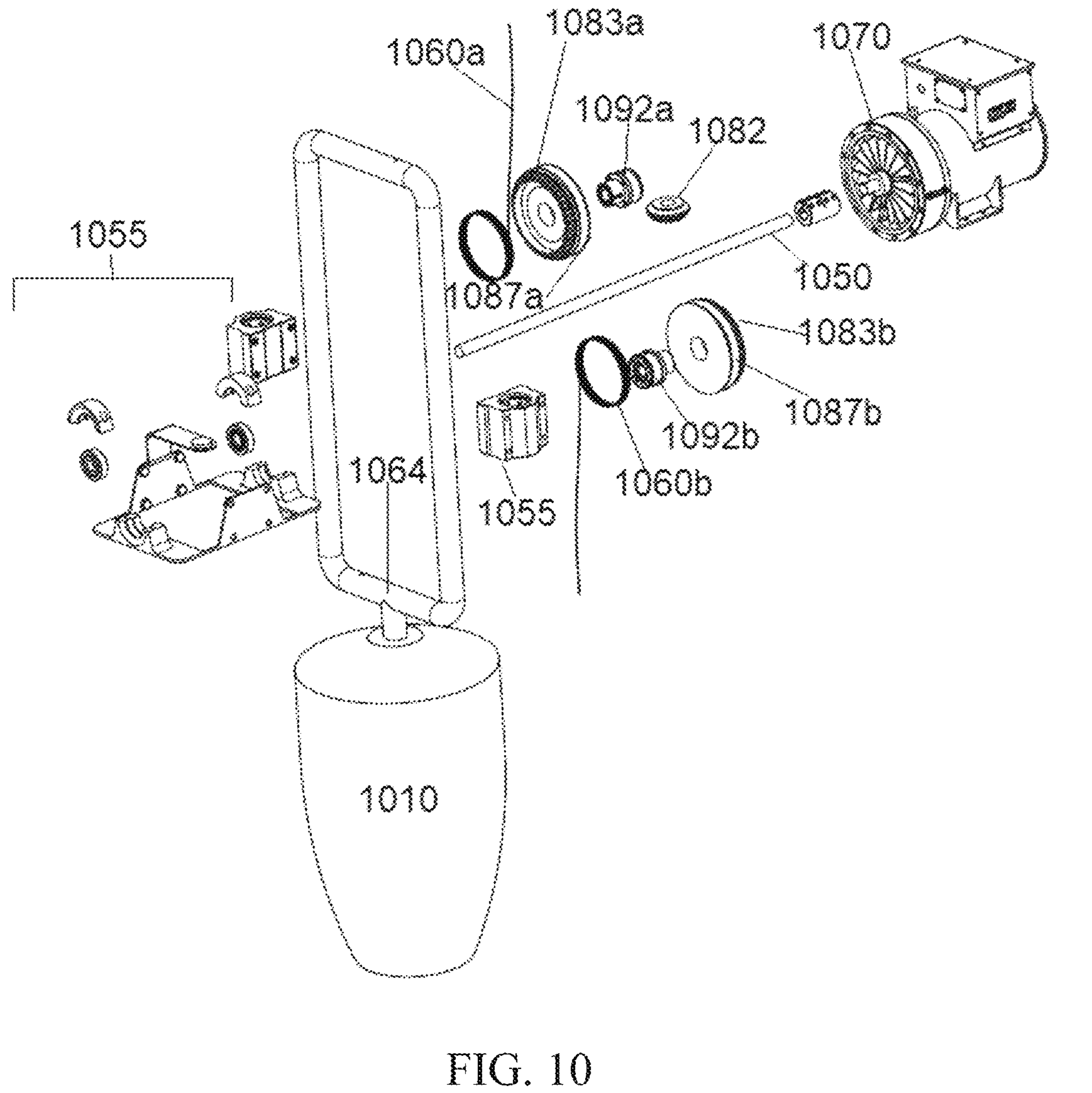
FIG. 10 provides a more detailed view of elements of the driving mechanism depicted in FIG. 9, in the context of an example of the apparatus described herein.
Figure 11:
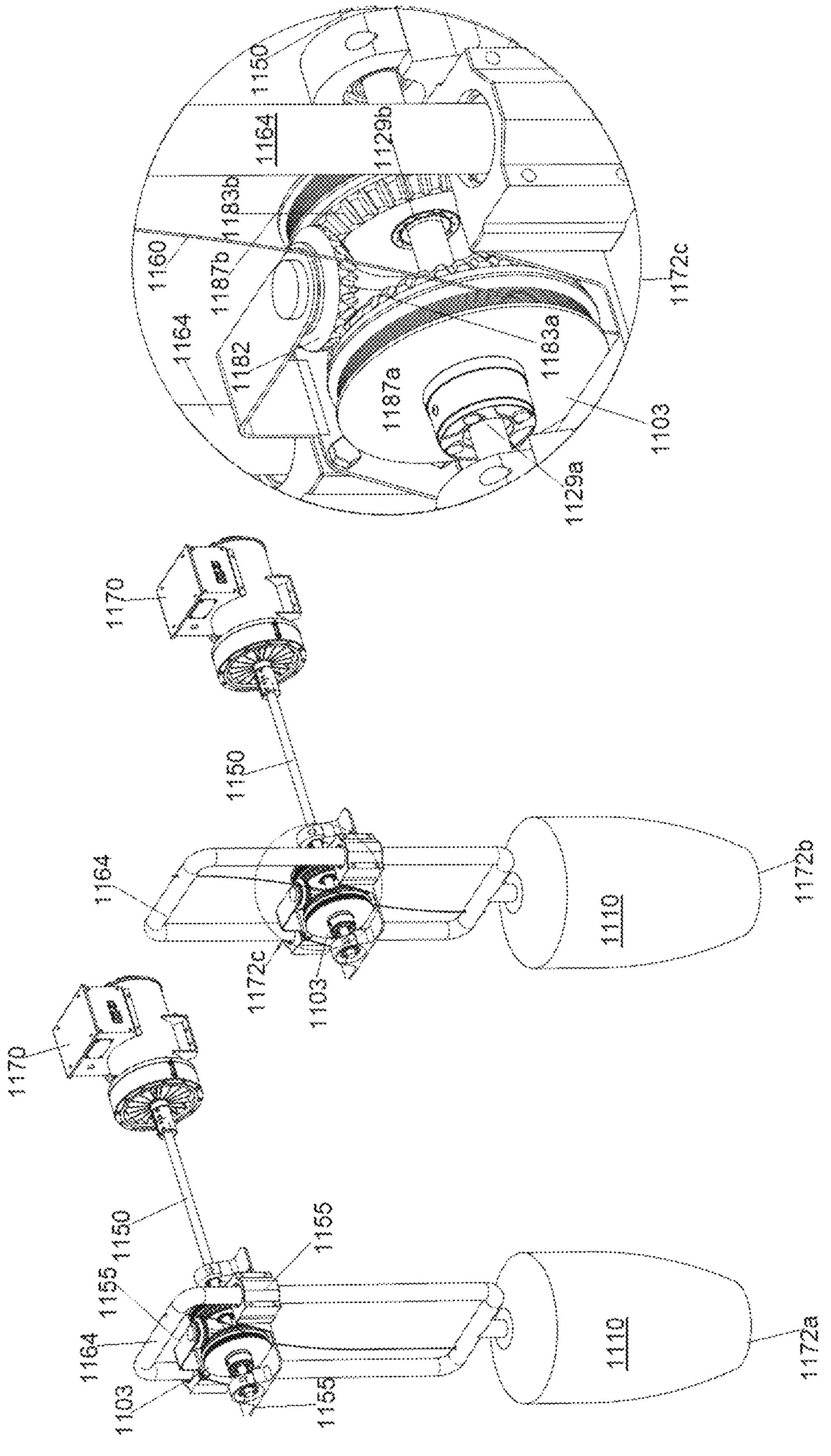
FIG. 11 illustrates the movement of the gear assembly relative to the frame in the examples of the apparatus depicted in FIGS. 9-10.

As aforementioned, FIGS. 9-14 illustrate various aspects of examples that include a planetary gear inserted between the two spools (utilized for recoil), rather than including recoil springs used for cable recoiling in earlier-discussed examples. FIG. 9 is a simplified block diagram that illustrates various aspects of a drive mechanism of an example of the apparatus described herein. The illustrated drive mechanism includes a planetary gear 982 which is inserted between the two spools 987*a*-987*b*. In this example, a shaft 950 extends through two-gears 983*a*-983*b*, which both inter-lock with the planetary gear 982. The shaft 950 continues to couple this drive mechanism to a generator (not pictured). On either side of the shaft 950, a one-way bearing 992*a*-992*b* is connected. The bearing 992*a*-992*b* can be understood as a ratchet or a mechanical rectifier. The bearings 992*a*-992*b* can be considered one-way mechanisms because they each apply a single directional torque to the shaft 950, in this example, a clockwise torque. The planetary gear 982 connects two gear 983*a*-983*b* on each side, parallel to each other (the shaft is oriented through the two gear 983*a*-983*b*, as illustrated in further figures). The planetary gear 982 transfers the rotation of a first gear 983*a* to a second gear 983*b*, so while one cable extends, the other cable retracts (e.g., when the first cable 960*a* extends, the second cable 960*b* retracts). Unlike the examples in earlier illustrations, this example does not include springs for cable retraction or cable tension. The one-way bearings 992*a*-992*b* can be fixed to the shaft 950. The spools 987*a*-987*b* (or modified wenches in some examples) can be fixed to the bearings 992*a*-992*b*, while the gears 983*a*-983*b* are each attached to a spool 987*a*-987*b*. Because the shaft 950 extends through both spools 987*a*-987*b* and on to the generator 970, it serves as the power takeoff mechanism in this example. The first cable 960*a* and the second cable 960*b* are fixed to their respective spools 987*a*-987*b* so that they will not slip. For context, FIG. 9 also illustrates a connection between the cables and an upper frame strut. Specifically, the first cable 960*a* connects to the upper frame strut, while the second cable 960*b* connects to the lower frame strut. The frame is not pictured but the extension of the cables is provided in FIG. 9 to contextualize this figure. The frame is a structural element utilized to hold various elements in place, such as the planetary gear 982 and the gears 983*a*-983*b*, and can take different shapes, including a a-frame or a square frame. With the spooling and unspooling of the cables 960*a*-960*b*, the gear assembly (e.g., planetary gear 982 and the gears 983*a*-983*b*) moves up and down in the frame. FIG. 11 illustrates the movement of the gear assembly relative to the frame 1164.

FIG. 10 provides a more detailed view of elements of the driving mechanism depicted in FIG. 9, in the context of an example of the floating body apparatus described herein. Specifically, FIG. 10 includes exploded views that detail various components that can comprise the driving mechanism, including the gears 1083*a*-1083*b* and the planetary gear 1082, in some examples herein. FIG. 10 illustrates a shaft 1050 which exploded views of the 1083*a*-1083*b* on either side. In this example, the gears 1083*a*-1083*b* and the spools 1087*a*-1087*b* reside on a combined reel and gearwheel component. Each of the gears connects to a one-way bearing 1092. The gearwheel of the planetary gear 1082 is also illustrated in the exploded view. When oriented to as a drive mechanism, the shaft 1050 threads through the one-way bearings 1092*a*-1092*b*. The reel portion (e.g., spools 1087*a*-1087*b*) is where one of the first cable 1060*a* or the second cable 1060*b* are wound. FIG. 10 also illustrates various brackets and other attachment mechanisms 1055 used to orient the gears 1083*a*-1083*b* and the planetary gear 1082, and other portions of this structure by attaching them to the frame 1064. The frame 1064 orients and anchors elements of the driving mechanism and supports the floating body 1010 itself. The attachment mechanisms 1055 pictured are provided as examples of connectors that could be used in examples herein to position various elements.

FIG. 11 provides a more detailed view of aspects of the driving mechanism 1103 of FIG. 9 and shows how the position of the gear assembly, which is the drive mechanism, changes relative to the frame as the drive assembly operates. FIG. 11 includes three depictions 1172*a*-1172*c* of portions of the apparatus. The middle depiction 1172*b* is inclusive of the right-most depiction 1172*c*. On the left of FIG. 11 is a first depiction 1172*a* of an example of the floating body 1110, the driving mechanism 1103, and a generator 1170, and all the elements that connect them. The first depiction 1172*a* contextualizes the use of attachment mechanisms 1155 by depicting the floating body 1110, a frame 1164 which secures the floating body 1110 and to which a planetary gear 1182 and the other portions of the driving mechanism discussed in FIG. 10 can be attached. The attachment mechanisms 1150 provided in this example are depicted for illustrative purposes only as a suggestion of a non-limiting type of securing mechanism that could be utilized to orient elements including the planetary gear 1182 and the gears 1183*a*-1183*b*. The middle image, the second depiction 1172*b*, is the same as the one on the left but the driving mechanism 1103 is in a different location in the frame because of the movement of the gears 1183*a*-1183*b* when generating power from the movement of the floating body 1110 based on the motion of waves or any other reciprocal motion. The close-up of portions of the driving mechanism 1103 is illustrated as a third depicture 1172*c*.

In FIG. 11, in all depictions 1172*a*-1172*c*, a shaft 1150 extends through gears 1183*a*-1183*b* secured to one-way bearing 1129*a*-1129*b* and continues to a generator 1170. On either side of the shaft 1150, a one-way bearing 1129*a*-1129*b* is connected; each bearing applies a single directional torque to the shaft 1150 (e.g., a clockwise torque). The planetary gear 1182 is an intermediary gear that through its coupling to the two gears 1183*a*-1183*b*, which is depicted in the third depiction 1172*c* (e.g., the teeth of the planetary gear 1182 fit in-between the teeth of the reel and gear wheels of the gears 1183*a*-1183*b* connected to each bearing 1129*a*-1129*b*). As such the planetary gear 1182 transfers the rotation of a first gear 1183*a* to the second gear 1183*b*, so while one cable extends, the other cable retracts (e.g., when the first cable 1160*a* extends, the second cable 1160*b* retracts). It is the extending and retracting of the cables 1160*a*-1160*b* that move the drive mechanism 1130 up and down in the frame 1164.

FIG. 11 illustrates how the first cable 1160*a* and the second cable 1160*b* are attached to the frame 1164. The one-way bearings 1129*a*-1129*b* can be fixed to the shaft 1150 and the spools 1187*a*-1187*b* can be fixed or otherwise attached to the bearings 1129*a*-1129*b*. The shaft 1150 extends through both spools 1187*a*-1187*b* and on to the generator 1170 and serves as the power takeoff mechanism, converting rotating engine power into electrical power. The first cable 1160*a* and the second cable 1160*b* can be fixed to their respective spools 1187*a*-1187*b* so that they will not slip.

Figure 12:
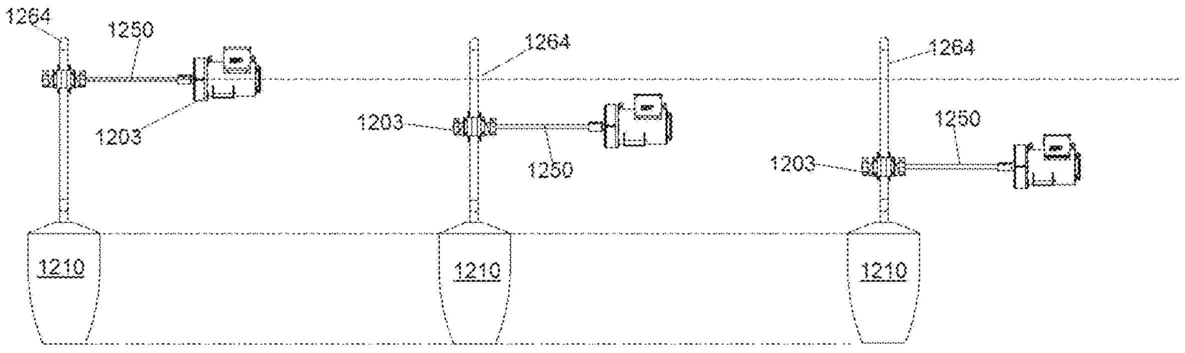
FIG. 12 illustrates examples of the apparatus described herein in operation.

FIG. 12 illustrates examples of the apparatus described herein in operation, to demonstrate, from a side perspective, the movement of the driving mechanism 1203 up and down relative to the frame 1264 responsive to the motion of the floating body 1210 (e.g., waves in the sea, etc.). The shaft 1250 and the generator 1250 move horizontally with the driving mechanism 1203.

Figure 13:
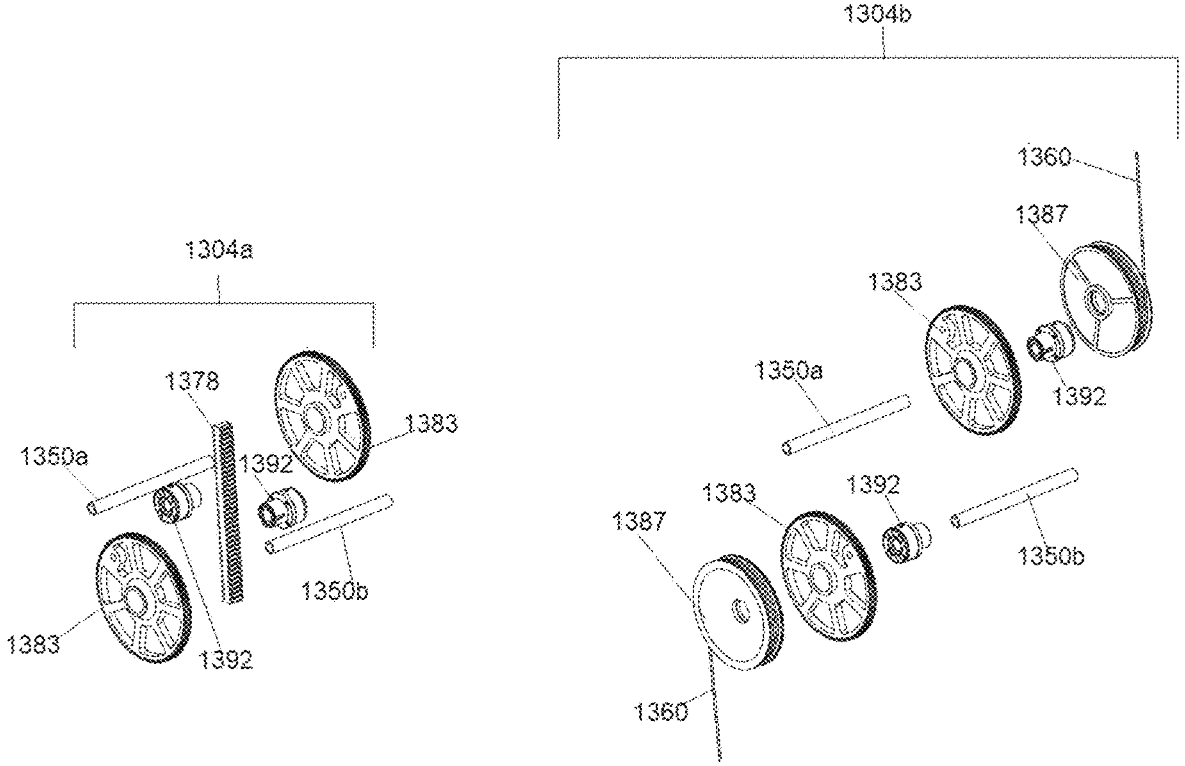
FIG. 13 is an exploded view of a dual shaft driving mechanism that is integrated into certain examples of the apparatus described herein.

As aforementioned, certain examples herein can include multiple shafts and also utilize gears in the driving mechanism as described in FIGS. 9-12. FIG. 13 is an exploded view of a dual shaft driving mechanisms 1304*a*-1304*b* with two shafts in different configurations. With the exception of the shafts 1350*a*-1350*b* 1450*a*-1450*b* in FIGS. 13-14, if an item is duplicated, it is given the same label for ease of understanding. Additionally, because FIG. 13 is an exploded view and FIG. 14 depicts the two orientations, there are elements in FIG. 13 that are present but not labeled in FIG. 14 because they are not visible.

Figure 14:
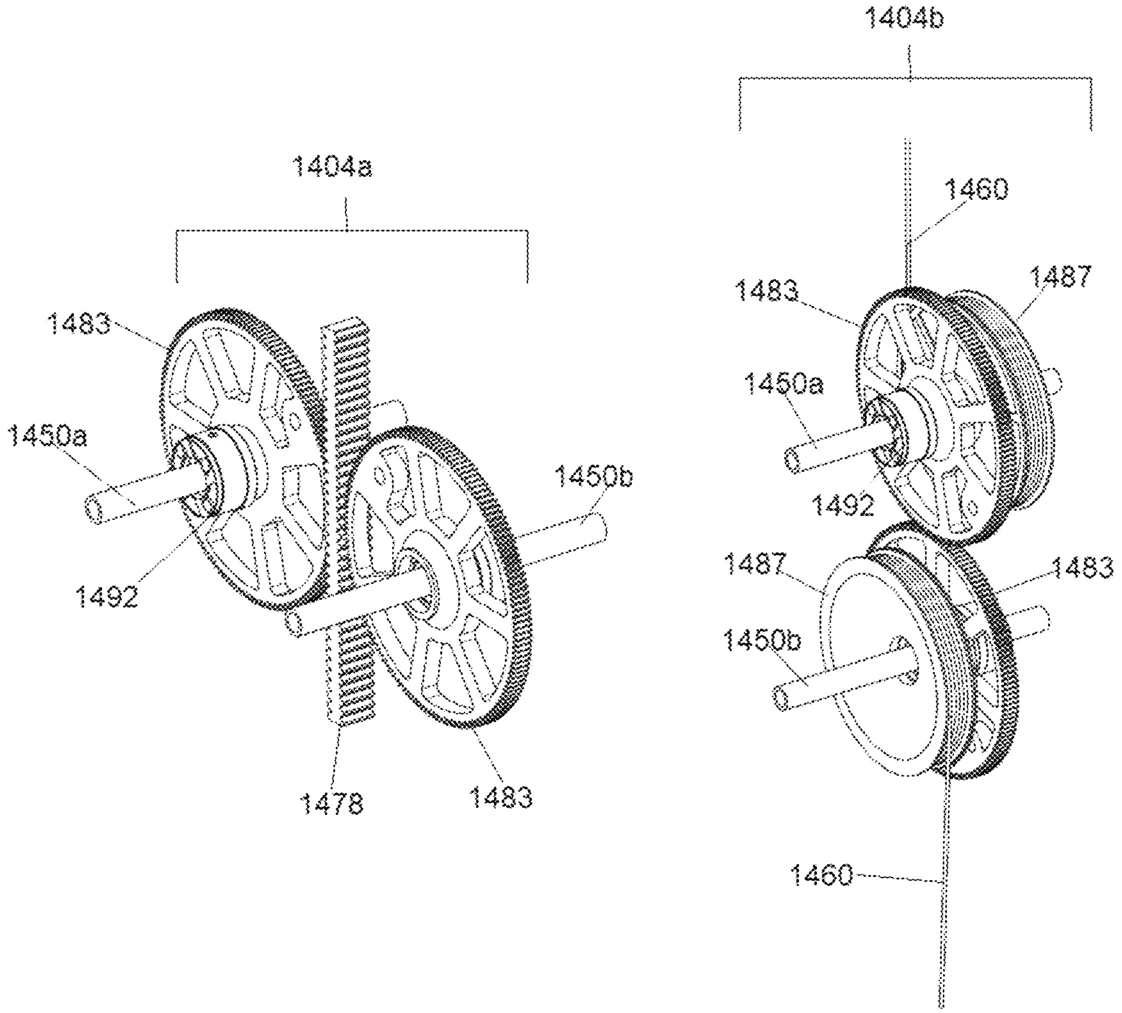
FIG. 14 illustrates an assembled dual shaft driving mechanisms that is integrated into certain examples of the apparatus described herein.

In FIGS. 13-14, the first configuration 1304*a* 1404*a* orients the two gears 1383 1483 relative to each other on a horizontal axis (side by side). Meanwhile, in the second configuration 1304*b* 1404*b*, the two gears 1383 1483 in this configuration are oriented along a vertical axis (one on top of the other).

In the first configuration 1304*a* 1404*a*, to accommodate the gears 1383 1483, a horizontal gear 1378 1478 is inserted between them. In the second configuration 1304*b* 1404*b*, the gears 1383 1483 piece together one on top of the other.

In both configurations 1304*a*-1304*b* 1404*a*-1404*b*, the gear shafts 1350*a* 1350*b* 1450*a* 1450*b* are threaded through the bearings 1392 1492. These multiple shaft examples function in a mechanically and electrically similar manner to the single shaft orientations discussed herein. The orientation of the cables 1360 1460 is based on the orientation of the gears 1383 1483.

Embodiments of the present invention include an apparatus and a method which both employ a floating body to extract power from wave activity or any other reciprocating activity. The apparatus can include a floating body, wherein the floating body reciprocates in a vertical direction based on motion; and a drive assembly, the drive assembly comprising: a drive tower connected to the floating body to move upwards and downwards in the vertical direction based on the movement of the floating body; at least one driving arm connected to the drive tower such that each driving arm of the at least one driving arm extends in a direction perpendicular to the vertical direction; at least one cable coupling the at least one driving arm to a clutch on a drive shaft; and the drive shaft, wherein the drive shaft rotates based on the movement of the floating body.

In some examples of the apparatus, at least one driving arm comprises a first driving arm and a second driving arm and the at least one cable comprises a first cable coupled to the first driving arm and a second cable coupled to the second driving arm.

In some examples of the apparatus, the drive shaft comprises a first one-way clutch and a second one-way clutch and wherein the first one-way clutch and the second one-way clutch rotate in a common direction.

In some examples of the apparatus, the first cable is coupled to the first one-way clutch and the second cable is coupled to the second one-way clutch.

In some examples of the apparatus, the first cable is coupled to the first one-way clutch at a first position and the second cable is coupled to the second one-way clutch at a second position.

In some examples of the apparatus, the floating body comprises: a sealed flotation container; and a skirt attached to the sealed floatation container and extending in the vertical direction, downward from the sealed floatation container.

In some examples of the apparatus, the skirt comprises air bleed valves.

In some examples of the apparatus, where the skirt is a cylinder, a first circular surface of the skirt is closed and a second circular surface of the skirt is open.

In some examples of the apparatus, the air bleed valves comprise one-way air bleed values.

In some examples of the apparatus, the drive assembly further comprises a first recoil spring to wind the first cable and a second recoil spring to wind the second recoil cable.

In some examples of the apparatus, the drive comprising a rigid material.

In some examples of the apparatus, the drive comprises metal.

In some examples of the apparatus, the apparatus includes a generator coupled to the drive assembly.

In some examples, the at least one driving arm is selected from the group consisting of: a one drive tower configuration and a two drive tower configuration.

In some examples, the floating body is positioned proximate to a body of water, and the reciprocating of the floating body in a vertical direction is based on the motion comprising motion of waves within the body of water.

In some examples, the floating body comprises a group of floating bodies connected in series to the drive shaft.

In some examples, the apparatus includes one or more additional drive assemblies, each of the one or more drive assemblies comprising: an additional drive connected to one or more additional floating bodies to move upwards and downwards in the vertical direction based on the movement of the floating body; at least one additional driving arm connected to the additional drive such that each driving arm of the at least one additional driving arm extends in a direction perpendicular to the vertical direction; at least one additional cable coupling the at least one additional driving arm to an additional clutch on an additional drive shaft; and the additional drive shaft, wherein the drive shaft rotates based on the movement of the one or more additional floating bodies, wherein the one or more additional floating bodies are connected in series to the additional drive shaft.

In some examples, the apparatus includes: a floating body, where the floating body is positioned proximate to a body of water such that movement of the floating body comprises the floating body reciprocating in a vertical direction based on motion of waves within the body of water; and a drive assembly, the drive assembly comprising: a drive connected to the floating body to move upwards and downwards in the vertical direction based on the movement of the floating body; at least one driving arm connected to the drive such that each driving arm of the at least one driving arm extends in a direction perpendicular to the vertical direction; at least one cable coupling the at least one driving arm to a clutch on a drive shaft; and the drive shaft, where the drive shaft rotates based on the movement of the floating body.

In some examples of the method, the method includes: placing an apparatus in a body of water, where the body of water experiences wave activity, the apparatus comprising: a floating body, where the floating body is positioned proximate to the body of water such that movement of the floating body comprises the floating body reciprocating in a vertical direction based on the wave activity; a drive assembly, the drive assembly comprising: a drive connected to the floating body to move upwards and downwards in the vertical direction based on the movement of the floating body; at least one driving arm connected to the drive such that each driving arm of the at least one driving arm extends in a direction perpendicular to the vertical direction; at least one cable coupling the at least one driving arm to a clutch on a drive shaft; and the drive shaft, where the drive shaft rotates based on the movement of the floating body; and extracting power from the apparatus based on the apparatus experiencing the wave activity, where based on the wave activity, comprising successive waves, the drive assembly moves upwards and downwards in the vertical direction and the drive shaft rotates clockwise during both the upwards and the downwards motion.

In some examples of the method, the at least one driving arm comprises a first driving arm and a second driving arm and the at least one cable comprising a first cable coupled to the first driving arm and a second cable couple to the second driving arm, and where the drive assembly further comprises: a first one-way clutch; and a second one-way clutch.

In some examples of the method, the drive assembly further comprises: a first recoil spring to wind the first cable around the first one-way clutch; and a second recoil spring to wind the second cable around the second one-way clutch.

In some examples of the method, the drive shaft rotating clockwise during both the upwards and the downwards motion further comprises: during the upwards motion, driving, by the first cable, the drive shaft clockwise via the first one-way clutch; and during the upwards motion, winding, by the second recoil spring, the second cable around the second one-way clutch.

In some examples of the method, the drive shaft rotating clockwise during both the upwards and the downwards motion further comprises: during the downwards motion, driving, by the second cable, the drive shaft clockwise via the second one-way clutch; and during the downwards motion, winding, by the first recoil spring, the first cable around the second one-way clutch.

In some examples of the method, the floating body comprises: a sealed flotation container; and a skirt attached to the sealed floatation container and extending in the vertical direction, downward from the sealed floatation container, where the skirt comprises air bleed valves, where the skirt is a cylinder, where a first circular surface of the skirt is closed, and a second circular surface of the skirt is open.

In some examples of the method, the method further comprises: during the upwards motion, opening the air bleed valves to expel trapped air from the skirt.

In some examples of the method, the method further comprises: during the downwards motion, closing the air bleed valves to trap water in the skirt.

In some examples of the method, the method further comprises: increasing the power extracted from the apparatus based on trapping the water in the skirt.

In some examples of the apparatus, the apparatus includes: a floating body, wherein the floating body is positioned proximate to a body of water such that movement of the floating body comprises the floating body reciprocating in a vertical direction based on motion of waves within the body of water; and a drive assembly, the drive assembly comprising: at least one vertical drive tower coupled to the floating body to move upwards and downwards in the vertical direction based on the movement of the floating body; at least one driving arm connected to the at least one vertical drive tower such that each driving arm of the at least one driving arm extends in a direction perpendicular to the vertical direction; at least one cable coupling each driving arm of the at least one driving arm to a clutch selected from one or more clutches on one or more drive shafts; and the one or more drive shafts, where each of the one or more drive shafts rotates based on the movement of the floating body.

In some examples of the apparatus, the apparatus includes one or more floating bodies, where the one or more floating bodies are positioned proximate to a body of water such that movement of the one or more floating bodies comprises the one or more floating bodies reciprocating in a vertical direction based on motion of waves within the body of water. The apparatus can also include one or more drive assemblies, each of the one or more drive assemblies comprising: at least one vertical drive tower coupled to at least one floating body of the one or more floating bodies to move the at least one floating body upwards and downwards in the vertical direction; at least one driving arm connected to the at least one vertical drive tower such that each driving arm of the at least one driving arm extends in a direction perpendicular to the vertical direction; at least one cable coupling each driving arm of the at least one driving arm to a clutch selected from one or more clutches on one or more drive shafts; and the one or more drive shafts, wherein each of the one or more drive shafts rotates based on the movement of the at least one floating body of the one or more floating bodies.

In some examples of the apparatus, the at least one floating body comprises two or more floating bodies, and wherein the two or more floating bodies are connected to the one or more drive shafts in series.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described to best explain various aspects and the practical application, and to enable others of ordinary skill in the art to understand various embodiments with various modifications as are suited to the particular use contemplated.

What is claimed is:

1. An apparatus comprising:

a floating body, wherein the floating body reciprocates in a vertical direction based on motion; and a drive assembly, the drive assembly comprising:

two bearings coupled to opposing sides of a frame, wherein each bearing applies a single directional torque to a drive shaft;

the drive shaft threaded through the bearings, wherein the drive shaft rotates based on the movement of the floating body;

a gear wheel attached to each bearing comprising a first gear wheel and a second gear wheel, wherein the first gear wheel and the second gear wheel are positioned parallel to each other, and wherein a space between the first gear wheel and the second gear wheel is bridged with a third gear, wherein the third gear is perpendicular to the first gear wheel and to the second gear wheel; and a spool attached to each bearing, wherein a cable is affixed to each spool, wherein each cable is affixed to an opposing side of the frame relative to another cable; and a generator coupled to the drive assembly via the drive shaft, wherein the generator serves as a power take-off mechanism, converting rotating engine power into electrical power.

2. The apparatus of claim 1, wherein the frame is a square, wherein the two bearings are coupled to vertical sides of the square, wherein the sides of the square are perpendicular to a surface of a body of water.

3. The apparatus of claim 2, further comprising:

a fixed platform floating on the surface of the body of water, wherein the drive assembly is coupled to an upper surface of the fixed platform, wherein the platform floats on the body of water.

4. The apparatus of claim 1, wherein the two bearings are coupled to the frame via mechanisms that travel up and down the opposing sides of the frame responsive to the motion.

5. The apparatus of claim 1, wherein the drive assembly moves upwards and downwards in the vertical direction based on the movement of the floating body.

6. The apparatus of claim 1, wherein the floating body comprises:

a sealed flotation container; and a skirt attached to the sealed floatation container and extending in the vertical direction, downward from the sealed floatation container.

7. The apparatus of claim 6, wherein the skirt comprises air bleed valves.

8. The apparatus of claim 7, wherein the skirt is a cylinder, wherein a first circular surface of the skirt is closed and a second circular surface of the skirt is open.

9. The apparatus of claim 8, wherein the air bleed valves comprise one-way air bleed values.

10. The apparatus of claim 1, wherein the floating body is positioned proximate to a body of water, and wherein the reciprocating of the floating body in a vertical direction is based on the motion comprising motion of waves within the body of water.

11. The apparatus of claim 1, wherein the floating body comprises a group of floating bodies connected in series to the drive assembly.

12. The apparatus of claim 1, further comprising:

one or more additional drive assemblies, each of the one or more drive assemblies comprising:

at least one additional drive assembly, the additional drive assembly comprising:

an additional two bearings coupled to opposing sides of an additional frame, wherein each bearing applies a single directional torque to the drive shaft;

an additional a drive shaft threaded through the additional bearings, wherein the additional drive shaft rotates based on the movement of the floating body;

an additional gear wheel attached to each bearing, wherein the additional gear wheels are bridged with a planetary gear; and an additional spool attached to each bearing, wherein an additional cable is affixed to each additional spool, wherein each additional cable is affixed to an opposing side of the additional frame relative to another cable; and a generator coupled to the additional drive assembly via the drive shaft, wherein the generator serves as a power takeoff mechanism, converting rotating engine power into electrical power.

13. A method comprising:

placing an apparatus in a body of water, wherein the body of water experiences wave activity, the apparatus comprising:

a floating body, wherein the floating body is positioned proximate to the body of water such that movement of the floating body comprises the floating body reciprocating in a vertical direction based on the wave activity;

a drive assembly, the drive assembly comprising:

two bearings coupled to opposing sides of a frame, wherein each bearing applies a single directional torque to a drive shaft;

the drive shaft threaded through the bearings, wherein the drive shaft rotates based on the movement of the floating body;

a gear wheel attached to each bearing comprising a first gear wheel and a second gear wheel, wherein the first gear wheel and the second gear wheel are positioned parallel to each other, and wherein a space between the first gear wheel and the second gear wheel is bridged with a third gear, wherein the third gear is perpendicular to the first gear wheel and to the second gear wheel; and a gear wheel attached to each bearing, wherein the gear wheels are bridged with a planetary gear; and a spool attached to each bearing, wherein a cable is affixed to each spool, wherein each cable is affixed to an opposing side of the frame relative to another cable; and extracting power from the apparatus based on the apparatus experiencing the wave activity, wherein based on the wave activity, comprising successive waves, the drive assembly moves upwards and downwards in the vertical direction and the drive shaft rotates clockwise during both the upwards and the downwards motion.

* * * * *